United States Patent
Tiberghien et al.

(10) Patent No.: US 7,878,216 B2
(45) Date of Patent: Feb. 1, 2011

(54) FEMALE CONNECTION PART COMPRISING A MEMBER FOR ACTUATING VALVES AND A CONNECTION COMPRISING SUCH A FEMALE PART

(75) Inventors: Alain Christophe Tiberghien, Sevrier (FR); Christophe Durieux, Gilly sur Isere (FR)

(73) Assignee: Staubli Faverges, Faverges (FR)

( * ) Notice: Subject to any disclaimer, the term of this patent is extended or adjusted under 35 U.S.C. 154(b) by 371 days.

(21) Appl. No.: 12/068,112

(22) Filed: Feb. 1, 2008

(65) Prior Publication Data

US 2008/0185844 A1 Aug. 7, 2008

(30) Foreign Application Priority Data

Feb. 5, 2007 (FR) .................................. 07 00800

(51) Int. Cl.
*F16L 37/33* (2006.01)
(52) U.S. Cl. .............................. 137/614.04; 137/614.03; 137/614.05
(58) Field of Classification Search ............ 137/614.02, 137/614.03, 614.04, 614.05, 614.06; 251/149.8, 251/149.9

See application file for complete search history.

(56) References Cited

U.S. PATENT DOCUMENTS

| 4,543,994 | A | * | 10/1985 | Johnson et al. | ........ | 137/614.04 |
| 4,564,042 | A | * | 1/1986 | Ekman | ................... | 137/614.05 |
| 5,586,748 | A | * | 12/1996 | Kish | ........................ | 251/149.8 |
| 2005/0164538 | A1 | * | 7/2005 | Tiberghien et al. | .......... | 439/289 |

FOREIGN PATENT DOCUMENTS

| EP | 1271073 A | 1/2003 |
| FR | 1360204 A | 5/1964 |
| GB | 2409502 A | 6/2005 |

* cited by examiner

*Primary Examiner*—John Rivell
*Assistant Examiner*—Kevin Murphy
(74) *Attorney, Agent, or Firm*—Dowell & Dowell PC

(57) ABSTRACT

A female coupling for receiving a male coupling element and including a female element and a body delimiting a receiving zone. The female element includes a passage having a reduced opening that is closed by a valve and a cylindrical bore for receiving a male connection element. The female element is connected to the body by a nut and a ring member that engage one another in a manner to permit radial displacement of the female element to the body in order to facilitate the alignment of an elongated axis of the male element with an elongated axis along the passage of the female element as the male element is inserted within the cylindrical bore of the female element.

18 Claims, 2 Drawing Sheets

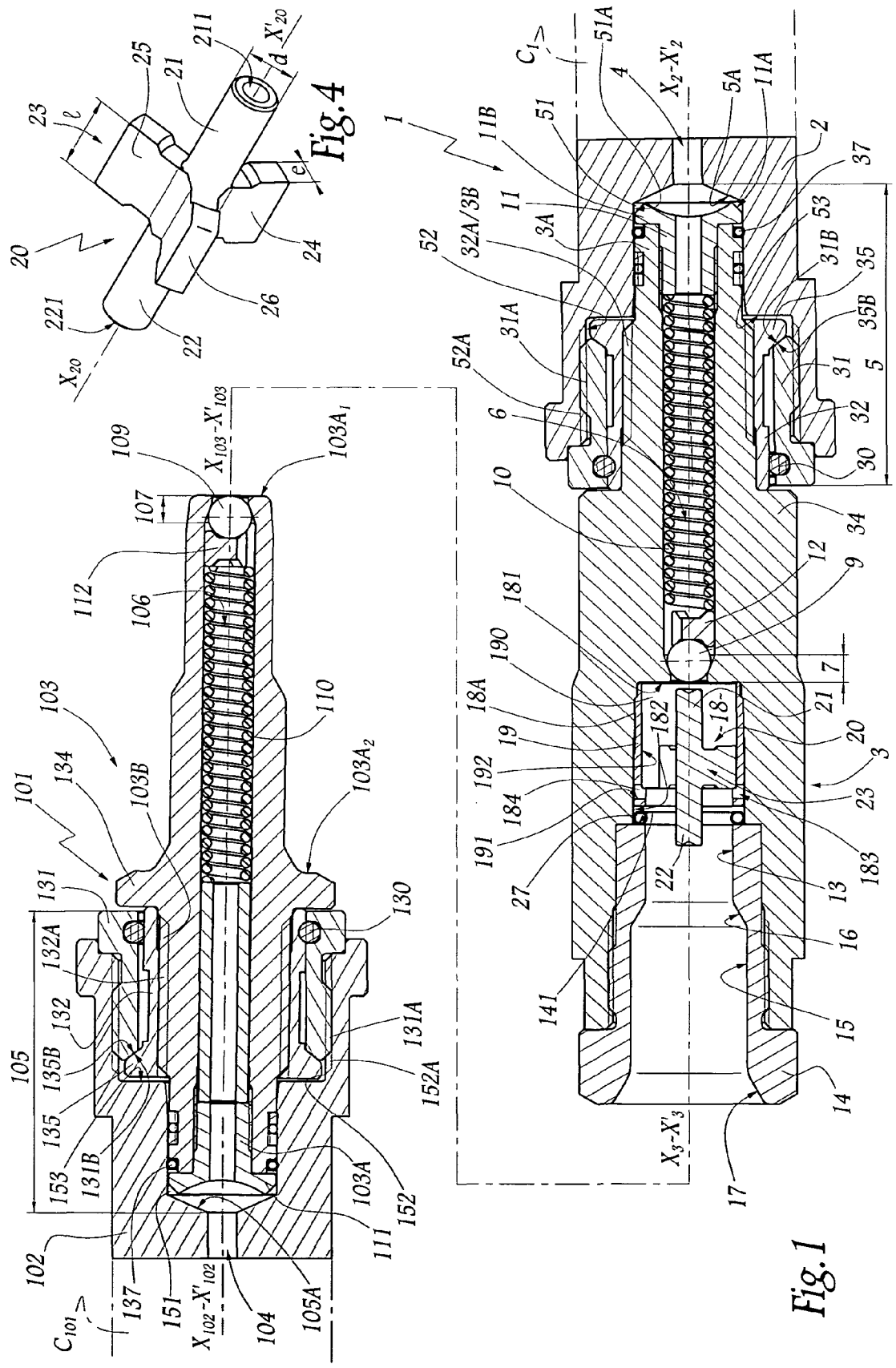

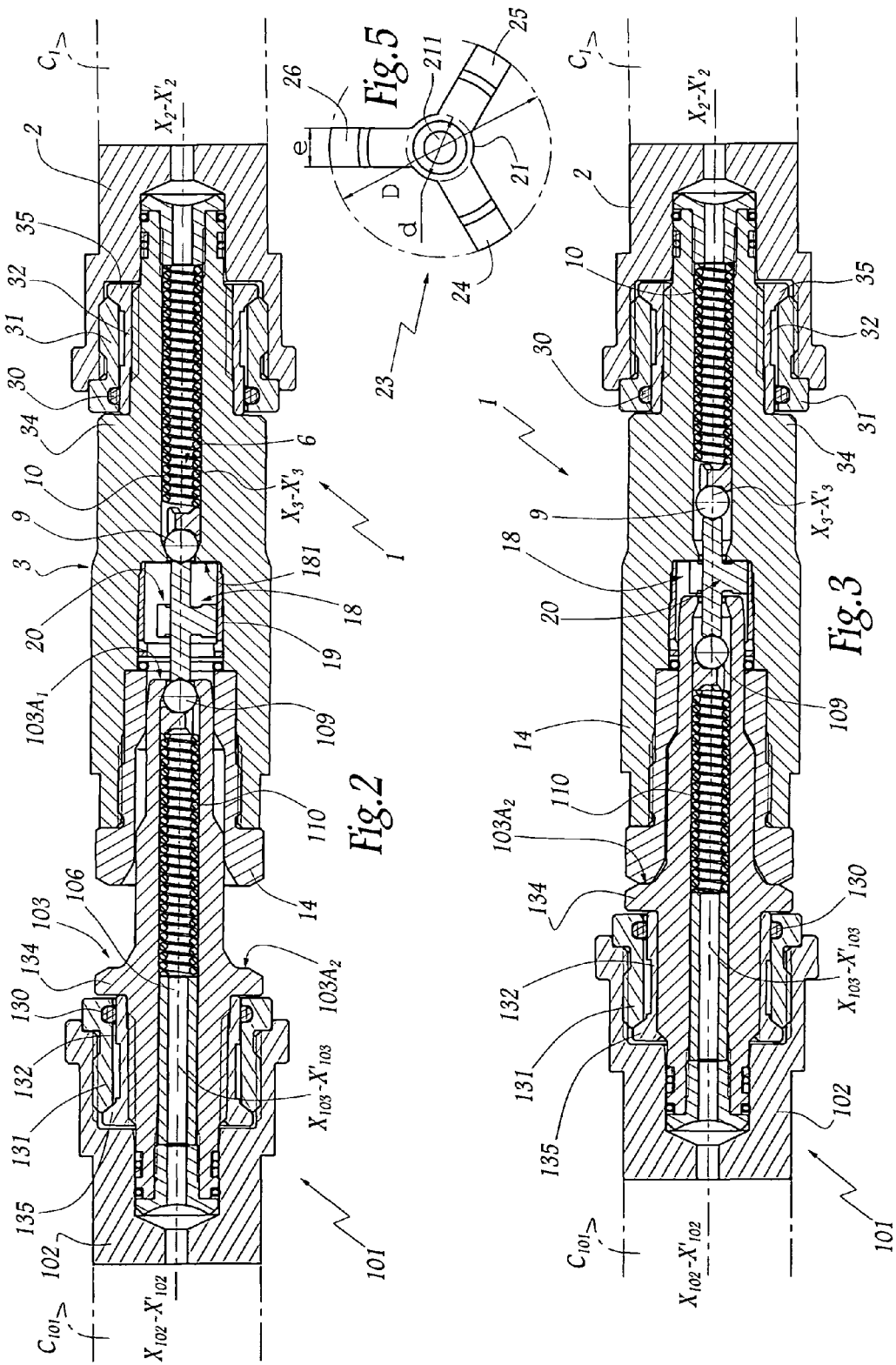

FEMALE CONNECTION PART COMPRISING A MEMBER FOR ACTUATING VALVES AND A CONNECTION COMPRISING SUCH A FEMALE PART

BACKGROUND OF THE INVENTION

1. Field of the Invention

The present invention relates to a connection, notably for submarine conduits, as well as to a female connection part intended to be coupled with a complementary male part in order to form such a connection.

2. Brief Description of the Related Art

Generally, a connection is formed with a male part and a female part which may comprise a male connection element and a female connection element respectively. When this occurs under the sea, the fitting of the male element into the female element may result from a mechanical device displacing one of the connection parts towards the other connection part. In this case, it may happen that the male element and the female element are not properly aligned with each other during the fitting operation.

US-2005-0164538 describes a connection, the male and female connection parts of which have long guiding zones in order to compensate a possible lack of alignment during their coupling. Thus, in order to facilitate the guiding of the male connection part into the female connection part, their facing surfaces are complementary. In order to allow fluid to flow between the conduits to be connected, the female element and the male element each include a passage in which the fluid may transit through. When the connection parts are assembled, the distal ends of each of these passages are therefore facing each other. By convention, the terms "proximal" and "distal" are defined by referring to the end of the connection part capable of being connected to a fluid conduit. The term "proximal" therefore designates an object close to the conduit, whereas the term "distal" designates an object which is further away from it.

The distal ends each have a shrinked section on which a valve intended to block the corresponding passage is supported. Thus, the male and female elements each include a translationally mobile valve between a blocking position, where it is supported on the shrinked section of the passage, and an open position where it is retracted inside the corresponding connection element. Further, the male and female elements each comprise an elastic member allowing the corresponding valve to be brought back into its position for blocking the passage.

As shown by US-2005-0164538, the relatively narrow and elongated shape of the external surface of the male element determines the geometry of its valve. Thus, this valve has the shape of an elongated relatively thin rod. The valve fitting out the female element also has the shape of an elongated thin rod. Both of these rods are laid out coaxially, and they are able to push back each other, in translation in their respective passages, after having been put into contact by coupling of the male and female elements.

Within the scope of a submarine application, the connection is subject to an external pressure which depends on the depth at which it is installed. This depth may be very great, such as in the case of offshore platforms. In order to maintain the seal of each connection element before their assembly, the elastic members should then exert large forces on the valves so as to maintain them in the blocking position. In the case illustrated by US-2005-0164538, each elastic restoring member consists of a helical spring, the overall dimensions of which are such that it has to be laid out inside the proximal portion of the passage behind the valve.

Each spring therefore exerts a compression force on the rear portion of the rod of the valve which it maintains in position. Consequently, the rod of each valve has a risk of deformation by buckling, which may lead to failure of the connection. One of the conduits may further contain a fluid under high pressure of the order of 1,200 bars, whereas the other one may contain a liquid which is at a comparatively low pressure, such as the piezometric pressure prevailing at the depth where the connection is found. In this case, the force required for opening the valve which blocks the high pressure conduit has to be very large. Each valve is then subject to considerable axial compression stresses, which are capable of causing its buckling.

The risk of buckling is further worsened by a lack of alignment between the male and female parts, which may occur during their assembly. Now, such a lack of alignment is relatively frequent when the coupling is achieved in a submarine medium by a robot. The risk of buckling also results from the limitation of the diameter of the valve rods with the purpose of obtaining the desired fluid flow rate in the passages.

Moreover, FR-A-1 360 204 describes a female element intended to receive a male connection element. The female element includes a fluid passage housing a spring and a blocking ball, a bore for receiving the male element and a member for actuating the ball capable of sliding in a guiding chamber of the female element. The actuating member comprises two axial rods, so as to open both sections of the conduit simultaneously. The female element has a thread so as to be screwed into the body of a female part. Such a screwed connection requires perfect alignment of the male element and of the female element during their connection otherwise the actuating member has risks of buckling and/or bending, in particular for high fluid pressures.

SUMMARY OF THE INVENTION

The object of the invention more particularly is to find a remedy to these drawbacks and notably to propose an element or a female connection part or a connection, fitted out with a device for actuating the valves, which has a reduced risk of buckling the valve rods.

For this purpose, the object of the invention is a female connection part intended to receive a male connection part and comprising a female element as well as a body delimiting a zone for receiving the female element, the female part being provided with means for jointing the female element in the zone, the female element comprising:

- a passage having a shrinked section, the passage housing a translationally mobile valve and an elastic member for returning the valve towards a position for blocking the shrinked section;
- a cylindrical bore intended to receive a male connection element fitted out with a valve.

The female part further comprises:

- a chamber extending axially between -the passage and the cylindrical bore and defining a cylindrical guiding surface; and
- a member for actuating the valves of the male and female connection elements capable of sliding in the chamber and comprised of a support extending radially from an axis of the cylindrical guiding surface right up to the cylindrical guiding surface, the actuating member further comprising two rods extending along the axis of the chamber on either side of the support, one of these rods being capable of penetrating into the passage, so as to open the corresponding valve.

Further, the jointing means comprise:

a tapped bore made in the distal portion of the receiving zone, the female element being associated with a nut capable of being screwed into or unscrewed from the tapped bore, the nut being rotationally mobile around the connection element between distal and proximal axial stops integral with the element, and a ring screwed onto the element, the ring including a distal surface capable of being jointed with a proximal surface of the nut.

In other words, the female part provided with jointing means, houses a translationally guided intermediate member capable of actuating the respective valves of the male and female elements of a connection. Further, this intermediate member has a specific geometry for reducing the risks of buckling of the elements of the connection element. Such jointing means contribute to reducing the buckling and bending risks, as they facilitate the mutual alignment of the male and female elements during their connection.

According to other advantageous features of this female connection element:

the cylindrical bore, the chamber and the passage are coaxial;

the cylindrical guiding surface is formed by a globally cylindrical bushing screwed into a tapped hole provided in the female connection element;

the bushing includes on the side of the cylindrical bore, an axial stop for the actuating member when it moves towards the cylindrical bore;

the cylindrical bore is made in a part screwed into the female element and the proximal portion of which forms an axial annular surface, and the female element comprises a gasket mounted in a housing defined by the axial annular surface and by a wall of the tapped hole and intended to be supported on an external cylindrical surface of the male element;

the support is comprised of at least two radial tabs uniformly distributed around an axis along which the rods extend;

the cylindrical guiding surface has a diameter larger than or equal to 42 mm and the rods each have a diameter less than or equal to 14 mm;

the external radial surface occupied by the radial tabs is less than or equal to 20% of the cylindrical guiding surface;

each radial tab has an axial length of the order of 6 mm and a thickness, considered in a plane perpendicular to the axis along which the rods extend, comprised between 1.5 mm and 3 mm;

the rods are of the same length;

the valve comprises a ball and the free ends of the rods have the shape of concave spherical caps, one of which has a diameter corresponding to that of the ball;

the valve comprises a finger extending along the axis of the passage in which this valve is housed;

the jointing means comprise an elastic annular member for radially returning the female element to a median jointing position, the annular member being mounted between the distal portion of the nut and the ring;

the distal surface of the ring and/or the proximal surface of the nut(s) substantially has (have) the shape of a truncated sphere portion.

Moreover, the object of the present invention is also a connection for rapidly and removably joining two conduits, this connection comprising a male part fitted with a valve and a female part as explained earlier.

According to a first alternative, each valve may comprise a blocking ball and an inserted part laid out between the ball and an elastic member for returning the valve towards a blocking position.

According to a second alternative, each valve may comprise a finger extending along the axis of the passage in which this valve is housed.

On another hand, the invention deals with the use of a connection as mentioned above for the rapid and removable submarine junction of two conduits capable of channeling a high pressure fluid, the male and female parts being intended to be actuated by a robot.

BRIEF DESCRIPTION OF THE DRAWINGS

The invention will be well understood upon reading the description which follows, given only as an example and made with reference to the appended drawings, wherein:

FIG. 1 is a schematic sectional illustration of a connection comprising a female connection part according to the invention and a male connection part with a complementary shape, both parts being disconnected;

FIG. 2 is a section similar to FIG. 1 seen at a smaller scale and illustrating an intermediate position for fitting the male connection part into the female connection part;

FIG. 3 is a section similar to FIG. 1 seen at a smaller scale and illustrating the final fitting position, in which the valves of the two connection parts are open;

FIG. 4 is a perspective view of an actuating member of the valves, which belongs to the female connection part illustrated in FIGS. 1-3;

FIG. 5 is a front view of the actuating member of FIG. 4.

DESCRIPTION OF THE PREFERRED EMBODIMENTS

In FIG. 1, a connection is illustrated for rapidly and removably joining two conduits $C_1$ and $C_{101}$, intended to be used under the sea and which includes a female part 1 and a male part 101, disconnected before their assembling as illustrated in FIGS. 2 and 3. This connection is therefore a "submarine" connection or a connection "for submarine conduits".

The part 1 of the connection includes a body 2 extending along an axis $X_2$-$X'_2$ and a female connection element 3 extending along an axis $X_3$-$X'_3$ forming the axis of symmetry for the element 3 and for the part 1. Also, the male part 101 of the connection includes a body 102 with an axis $X_{102}$-$X'_{102}$ and a male element 103 extending along an axis $X_{103}$-$X'_{103}$. The body 2 delimits a channel 4 opening out on one side into a receiving zone 5 of the element 3 and connected on the other side to a fluid conduit $C_1$ illustrated as dot and dash lines.

The female element 3 is fitted into the receiving zone 5 by jointing means intended to facilitate mutual alignment of the male 103 and female 3 elements. These jointing means may therefore allow radial displacement of the element 3 relatively to the body 2, as this is shown in FIG. 1. In practice, the bodies 2 and 102 are made integral with distinct plates which are brought closer together for performing the coupling. The joint of the male 103 and female 3 elements in their respective bodies allows the alignment defects between the axes $X_2$-$X'_2$ and $X_{102}$-$X'_{102}$ to be absorbed.

The female element 3 is crossed by a passage 6 of a cylindrical shape with a circular base, which extends along the $X_3$-$X'_3$ axis. The passage 6 has a shrinked frusto-conical section 7 at its distal end, i.e. the furthest away from the fluid conduit $C_1$.

The passage 6 is provided with a valve notably comprising a spherical ball 9, the diameter of which is larger than the smallest dimension of the shrinked section 7, but less than the diameter of the passage 6. Thus, the ball 9 is free to translationally move in the passage 6 which it may sealably block when it is supported on the shrinked section 7 which forms a seat for the ball 9. Moreover, the passage 6 houses a helical spring 10 with which the ball 9 may be brought back into the position for blocking the shrinked section 7 and extending longitudinally along the axis of symmetry of the cylindrical passage 6. To use at best the space of the passage 6, the outer diameter of the spring 10 may be selected substantially equal to the diameter of the passage 6.

The zone 5 for receiving the element 3 consists of two coaxial bores 51 and 52. The bores 51 and 52 have the shape of cylinders with circular bases extending along an axis $X_2$-$X'_2$ of the body 2. The proximal bore 51, which belongs to the proximal region of the zone 5, has a diameter less than that of the distal bore 52, so that both bores are connected through an axial annular surface 53. The proximal portion of the element 3 includes an end piece 3A of a cylindrical shape with a circular base and with an axis $X_3$-$X'_3$ which defines the axis of revolution of the element 3. The diameter of the end piece 3A and the diameter of the proximal bore 51 are determined so as to allow them to be fitted to each other.

The proximal portion, i.e. the closest to the fluid conduit $C_1$, of the end piece 3A is equipped with a stop 11 screwed into the element 3 via a thread provided in the passage 6. The centre of the stop 11 is pierced with a through-port so as to have the channel 4 communicate with the passage 6. The stop 11 further comprises an annular head 11B which extends axially from the annular end of the male element 3 towards the channel 4. The dimensions of the head 11B also allow it to be inserted into the proximal bore 51.

The proximal portion of the cylindrical end piece 3A has a shoulder which delimits with the head 11B an annular groove in which a rigid seal gasket 37 is mounted. The seal gasket 37, which may be metal, is adjusted so as to be strongly supported on the radial surface 51A of the bore 51. The seal gasket 37 is thus positioned in the annular groove between the element 3 and the body 2 when the latter are coupled with each other and may thus provide a sealed connection between each other, including when the fluid is under high pressure.

The zone 5 has a tapped thread 52A made in the distal portion, i.e. on the open side, of the distal bore 52, in order to cooperate with a nut 31 associated with the element 3. The nut 31 has a thread 31A made on its external radial surface and in its proximal portion, so as to be screwed into the tapped thread 52A. Moreover, the nut 31 is connected to the element 3 via a ring 32 made integral with this element. The ring 32 has a globally cylindrical shape with a circular base, the axis of which coincides with the $X_3$-$X'_3$ axis. Its internal cylindrical surface has a tapped thread 32A so as to cooperate with a complementary thread 3B provided on the element 3.

The nut 31 is laid out substantially coaxially with the ring 32 and its internal radial surface is globally complementary to the external radial surface of the ring 32. The dimensions of the nut 31 and of the ring 32 are selected so as to provide functional play between both of these parts along a radial direction. The nut 31 is thereby free to rotate around the ring 32. The nut 31 is therefore rotationally mobile around the element 3.

The proximal end of the ring 32 forms a flange 35. The flange 35 has an external diameter less than the diameter of the distal bore 52. The distal face 35B of the flange 35 substantially has the shape of a truncated sphere part converging towards the $X_3$-$X'_3$ axis, when it approaches the ball 9, so as to form a proximal axial stop for the nut 31 during its displacement towards the conduit $C_1$. For this, the proximal part of the nut 31 has a surface 31B in the shape of a truncated sphere part substantially complementary to that of the distal face 35B of the flange 35. The nut 31 and the ring 32 form a jointed link allowing angular or radial displacement. The element 3 may thereby rotate relatively to a radial axis passing through the $X_2$-$X'_2$ axis of the body 2. An elastic annular member 30 housed between the distal part of the nut 31 and the ring 32 however allows the ring 32 and the element 3 to be returned into a median joint position. The external radial surface of the element 3 has a shoulder 34 forming a distal abutment surface for the nut 31.

In the same way, the head 11B of the stop 11 may have an external frusto-conical radial surface 11A so as to be jointed on the frusto-conical bottom 5A and to thereby facilitate fitting of the end piece 3A into the proximal bore 51.

In addition to the ball 9, the valve of the part 1 comprises an inserted part 12 laid out between the ball 9 and the spring 10. The inserted part 12 here consists of three tabs joined together at the axis $X_3$-$X'_3$ of the passage 6 and extending radially from this $X_3$-$X'_3$ axis. In a plane perpendicular to the $X_3$-$X'_3$ axis, the three tabs are uniformly distributed, at about 120°, around this $X_3$-$X'_3$ axis. The part 12 has the function of transmitting to the ball 9 in an optimum way, the elastic restoring force exerted by the spring 10. The latter operates in compression between the stop 11 and the valve comprised of the part 12 and of the ball 9.

The female connection element 3 has, in its distal portion, a cylindrical bore 13 intended to receive the male element 103 of the part 101. For practical reasons discussed in the following, the cylindrical bore 13 is made in a part of revolution 14, the axis of which coincides with the $X_3$-$X'_3$ axis. The part of revolution 14 is screwed into the female element 3 at its distal portion. The internal radial wall of this part of revolution 14 has a stepped design which is flared in the direction of its mouth through which the element 103 may be engaged towards the element 3. For this, this internal radial wall consists of a second cylindrical bore 15, the diameter of which is larger than that of the bore 13. A surface is described here as "radial" or "axial" with reference to a direction normal to this surface. The bores 13 and 15 are connected through a frusto-conical part 16. Further, the mouth of the part 14 is formed by a second frusto-conical part 17, the small diameter of which corresponds to the diameter of the second bore 15. This stepped design is used for guiding the male element 103 towards the female element 3, which facilitates coupling of the parts 1 and 101 of the connection.

The part 101 has a general constitution similar to that of the part 1. A reference used hereafter for designating a component of the connection part 101 similar or equivalent to a referenced assembly of the part 1, is obtained by increasing the reference number by 100 locating this component of the part 1. The references of the body 102 of the part 101, of the male element 103, of the channel 104, of the end portion 105, of the through-passage 106 and of its shrinked section 107, of the ball 109, of the spring 110, of the stop 111 and of the inserted part 112, are notably obtained in this way. The ball 109 and the part 112 form together the valve of the part 101. The body 102 is connected to a conduit $C_{101}$. The parts 103, 109, 110, 111, 132 are centered on an axis $X_{103}$-$X'_{103}$ forming an axis of symmetry for the element 103 and intended to be aligned with the $X_3$-$X'_3$ axis when coupling the male 101 and female 1 parts.

Between the cylindrical bore 13 and the through-passage 6, the female element 3 includes a cylindrical hole 18 with a circular base and including a tapped thread 18A. A bushing 19 is screwed into the tapped thread 18A. The cavity defined by the bushing 19 forms a cylindrical chamber 190, which may be with a circular base or not, or even with a prismatic base. The axis of the chamber 190 here coincides with the $X_3$-$X'_3$ axis of the part of revolution 14, therefore of the cylindrical bore 13. In other words, the cylindrical bore 13, the chamber 190 and the passage 6 are coaxial.

Within the chamber 190, the female connection element 3 houses a member 20 for actuating the balls 9 and 109. For actuating the balls 9 and 109, this member 20 comprises two rods 21 and 22 which extend between the cylindrical ball 13 and the passage 6, along an axis $X_{20}$-$X'_{20}$ which, when the member 20 is mounted in the chamber 190, is aligned with the axis of the chamber 190, which coincides with the $X_3$-$X'_3$ axis. As this is shown in the figures, the proximal rod 21 is intended to actuate the ball 9 of the element 3, whereas the distal rod 22 is intended to actuate the ball 109 of the element 103.

The member 20 further comprises a support 23, from which the rods 21 and 22 extend axially and which extends radially right up to a cylindrical guiding surface 192, formed by the internal radial wall of the chamber 190, i.e. of the bushing 19 here. The support 23 therefore occupies the median portion of the member 20 and is supported on the surface 192.

In the example illustrated by the figures, the proximal 21 and distal 22 rods are coaxial and of the same length. They may have different dimensions and positions according to the respective characteristics of the shrinked sections 7 and 107. It is however advantageous that these rods have the same length, because the risk of buckling of these rods under the pressure exerted by the balls 9 and 109 is then minimized and evenly distributed among them.

The rods 21 and 22 of the member 20 have a diameter d by about 13.5 mm less than the smallest diameters of the sections 7 and 107 respectively. Thus, the rods 21 and 22 may respectively penetrate into the passages 6 and 106 crossing the elements 3 and 103, as this is shown in FIG. 3. In order to facilitate their cooperation with the balls 9 and 109, the rods 21 and 22 respectively have free ends 211 and 221 in the shape of concave spherical caps, i.e. for which the radius of curvature extends out of the corresponding rod. Advantageously, the diameters of each spherical cap 211 and 221 correspond to the diameters of each ball 9 and 109, respectively. With such geometry, significant forces may be transmitted to the balls 9 and 109 while minimizing the contact pressures which they undergo.

In the illustrated embodiment, the support 23 consists of three tabs 24, 25 and 26, extending radially from the $X_{20}$-$X'_{20}$ axis of the member 20 and uniformly distributed around this axis $X_{20}$-$X'_{20}$. These three radial tabs 24-26 are therefore spaced out two by two by an angle of about 120° in a plane perpendicular to the $X_{20}$-$X'_{20}$ axis. In this case, the three tabs 24, 25 and 26 have the same dimensions and are each supported on the surface 192.

Certain dimensions of the actuating member are also illustrated by FIG. 5. Thus, the tabs 24-26 have a thickness e of 2 mm, comprised between 1.5 mm and 3 mm. The tabs 24-26 further have an axial length of 6 mm. Further, the tabs 24-26 are inscribed in a cylinder with a diameter of at least 42 mm, which represents the diameter of the cylindrical surface 192.

Taking their dimensions into account, the tabs 24-26 only occupy 8% of the cylindrical surface 192, i.e. less than 20%. Consequently, the fluid flow rate in the cylindrical chamber 190 may be significant whereas friction is reduced.

The bushing 19 is made in a material, such as bronze, having a low friction coefficient as compared with the tabs 24-26, which may be made in steel. A friction coefficient less than 0.2 is described as being low. This facilitates the sliding of the end of the radial tabs 24-26 on the surface 192. Thus, the member 20 is made to be easily mobile in translation in the chamber 190 along the axis $X_3$-$X'_3$.

The distal portion of the bushing 19 includes a shoulder 191 which forms a stop in the axial direction for the member 20, when the latter moves towards the bore 13 and the male element 103. Indeed, the tabs 24-26 have an axial length such that they will be pressed against the shoulder 191 when the member 20 is displaced towards the bore 13. When it moves in the other direction, i.e. towards the passage 6 and the conduit $C_1$, the member 20 will abut onto the proximal axial wall 181 of the hole 18. Moreover, the distal part of the bushing 19 has two internal radial holes 183 and 184, symmetrical relatively to the $X_3$-$X'_3$ so as to receive a tool for screwing and unscrewing the bushing 19 in the hole 18.

The proximal annular surface 141 of the part 14 defines with the radial wall 182 of the hole 18 a housing for a seal gasket 27. The gasket 27 has the function of providing the seal between the elements 3 and 103 when they are coupled together, as this is seen in FIG. 3. The gasket 27 will then be pressed around a distal and external cylindrical surface of the element 103. The gasket 27 may consist of a metal gasket.

FIGS. 1-3 show the female part 1 and the male part 101 in three positions illustrating three successive steps for their coupling. In FIG. 1, the parts 1 and 101 are disconnected. By means of its guiding by the part 14, the element 103 is first partly engaged, as this is seen in FIG. 2, and then completely engaged as this is seen in FIG. 3, into the element 3. In the intermediate position illustrated by FIG. 2, the member 20 enters into contact with the balls 9 and 109. The latter are again supported on the sections 7 and 107 respectively, so that the passages 6 and 106 are not yet put into communication.

Next, when the element 103 continues to be moved towards the element 3 according to a translation of axis $X_2$-$X'_2$, the member 20 through its rods 21 and 22, is subject to a globally axial compressive force. One of the balls 9 or 109 leaves its blocking position thereby opening the corresponding passage 6 or 106. In fact, the ball which blocks the passage is the one in which prevails the lowest fluid pressure, which is displaced the first within its passage 6 or 106.

If the fluid pressure prevailing in the conduit $C_1$ is less than that prevailing in the conduit $C_{101}$, the ball 9 first leaves the shrinked section 7, i.e. before the ball 109 leaves the section 107. The member 20 ends its translational travel when the tabs 24-26 of the support 23 abut on the annular wall 181 of the chamber 190.

After immobilization of the member 20, the valve of the element 103, consisting of the ball 109 and of the part 112, leaves its blocking position, thereby opening the passage 106. From this instant, the passages 6 and 106 are put into communication and the fluid starts to flow between the conduits $C_{101}$ and $C_1$. An additional displacement of the element 103 results in elastic compression of the spring 110. The end of travel of the element 103 is reached a little before or when an annular surface $103A_2$ of the element 103 abuts against the part 14. In this position illustrated by FIG. 3, the gasket 27 then provides the seal between the elements 3 and 103. The parts 1 and 101 may then be maintained in this coupling position by suitable means not shown.

Conversely, if the fluid pressure prevailing in the conduit $C_1$ is larger than the fluid pressure prevailing in the conduit $C_{101}$, the ball 109 leaves its support the first until the element 103 via a distal annular surface $103A_1$ abuts on the tabs 24-26 of the support 23, which is then displaced in translation along the $X_3$-$X'_3$ axis causing the rod 21 to penetrate into the passage 6 and consequently displace the ball 9 until it reaches its end of travel.

According to another operating mode, the balls 9 and 109 leave their respective blocking positions before the tabs 24-26 abut on the surface 181 or on the surface 103A$_1$. Indeed, depending on the stiffnesses selected for the springs 10 and 110 and on the relative pressure between the conduits C$_1$ and C$_{101}$, the compression forces exerted on the balls 9 and 109 may counterbalance each other and the balls 9 and 109 leave their support simultaneously.

The invention provides considerable reduction in the risks of buckling of the parts making up the valves and of the parts which actuate the latter, because it avoids the use of valve rods of great length. Each valve rod may thereby be replaced with a ball 9 or 109 possibly supported on an inserted part 12 or 112.

As for the member 20, it has a low buckling risk insofar that the rods 21 and 22 may have a reduced length, just sufficient for actuating the valves. Indeed, the maximum admissible buckling load is inversely proportional to the square of the free length of a rod. Further, the median support 23 reinforces the resistance of the member 20 to the stresses which the latter undergoes during coupling of the male and female parts.

Further, the jointing means limit the risks of buckling, because they contribute to proper alignment of the male and female parts with each other during their coupling. The female part 1 and the connection which incorporates it therefore have high resistance to buckling, notably by the effect of the jointing means.

It is not necessary to provide a stop behind each valve, unlike the connection described in US-2005-016438. As this is discussed above, it is the support 23 which stops the translational travel of the actuating member 20 and consequently of each of the valves. The functions of axial stops, fulfilled beforehand by each valve by means of a relatively complex and therefore expensive shape, are fulfilled from now on by the actuating member 20 housed in the chamber 190 which guides it.

Other embodiments are possible without however departing from the scope of this invention. For example, the balls 9 and 109 may be replaced with short fingers extending along the axes of the passages 6 and 106 respectively. Moreover, a helical spring may also be placed between the member 20 and a fixed part integral with the element 3, such as the axial annular wall 181. Such a spring would thereby provide reinforcement of the stability of the member 20 during its translational motion.

The invention may be adapted to a female connection part according to US-2005-0164538 in order to apply the invention described in this document. This connection part is provided with means for jointing the female element in the corresponding receiving area.

The invention claimed is:

1. A female fluid coupling connection part for receiving a male fluid coupling connection part and comprising a female element and a body defining a receiving zone for receiving the female element and means for radially adjusting an alignment of the female element in the receiving zone of the body, the female element including:

a passage having a reduced section defining an opening into the first passage, the passage housing a movable valve and an elastic member for urging the valve towards a position for blocking the opening;

a cylindrical bore for receiving a male element of the male fluid coupling connection part and wherein the male element includes a valve;

a chamber extending axially between the passage and the cylindrical bore and defining a cylindrical guiding surface; and an actuating member for actuating the valves of the male and female elements slidably mounted in the chamber and including a support extending radially from an axis of the cylindrical guiding surface to the cylindrical guiding surface, the actuating member further including two rods extending along an axis of the chamber on either side of the support, one of these rods being capable of penetrating into the passage so as to open the valve of the female element;

the body including a tapped bore in a distal portion of the receiving zone;

the means for radially adjusting the alignment of the female element including a nut threadingly adjustable within the tapped bore, the nut being rotationally mobile around the female element between distal and proximal axial stops of the female element, and a ring screwed onto the female element, the ring including a distal surface being engagable with a proximal surface of the nut in such a manner as to permit articulation of the female element relative to the nut to thereby facilitate relative alignment of a male element when being inserted into the female element.

2. The female fluid coupling connection part according to claim 1, wherein the cylindrical bore, the chamber and the passage are coaxial.

3. The female fluid coupling connection part according to claim 1, wherein the cylindrical guiding surface is formed by a globally cylindrical bushing screwed into a tapped hole made in the female element.

4. The female fluid coupling connection part according to claim 3, wherein the bushing includes, on a side of the cylindrical bore, an axial stop for the actuating member when it moves towards the cylindrical bore.

5. The female fluid coupling connection part according to claim 1, wherein the cylindrical bore is made in one part screwed into the female element and a proximal portion of which forms an axial annular surface, and the female element includes a gasket mounted in a housing defined by the axial annular surface and by a wall of the tapped hole and intended to be supported on an external cylindrical surface of the male element.

6. The female fluid coupling connection part according to claim 1, wherein the support includes at least two radial tabs uniformly distributed around an axis along which the rods extend.

7. The female fluid coupling connection part according to claim 6, wherein the cylindrical guiding surface has a diameter larger than or equal to 42 mm and in that the rods each have a diameter less than or equal to 14 mm.

8. The female fluid coupling connection part according to claim 7, wherein an external radial surface occupied by the radial tabs is less than or equal to 20% of the cylindrical guiding surface.

9. The female fluid coupling connection part according to claim 8, wherein each radial tab has an axial length of 6 mm and a thickness, considered in a plane perpendicular to the axis along which the rods extend, between 1.5 mm and 3 mm.

10. The female fluid coupling connection part according to claim 1, wherein the rods are of the same length.

11. The female fluid coupling connection part according to claim 1, wherein the valve of the female element includes a ball and in that free ends of the rods have a shape of concave spherical caps, one of which has a diameter corresponding to that of the ball.

12. The female fluid coupling connection part according to claim 1, wherein the valve of the female element includes a finger extending along the axis of the passage in which this valve is housed.

13. The female fluid coupling connection part according to claim 1, wherein the means for radially adjusting the female element includes an elastic annular member for radially returning the female element to a median position, the annular member being mounted between a distal portion of the nut and the ring.

14. The female fluid coupling connection part according to claim 1, wherein a distal surface of the ring and/or a proximal surface of the nut have a shape of a truncated sphere portion.

15. A connection for rapidly and removably joining two conduits, the connection comprising a male part fitted with a valve, wherein the connection comprises a female fluid coupling connection part according to claim 1.

16. The connection according to claim 15, wherein each valve includes a blocking ball and an inserted part positioned between the ball and an elastic member for returning the valve towards a blocking position.

17. A connection for rapidly and removably joining two connection conduits comprising a male part fitted with a valve, and a female part according to claim 12.

18. The use of a connection according claim 15 for the rapid and removable coupling and uncoupling of two conduits under water wherein the conduits are capable of channeling a high pressure fluid, the male and female fluid coupling parts being actuated by a robot.

* * * * *